Nov. 10, 1959  H. B. SCHRAMM ET AL  2,911,997
PRESSURE RESPONSIVE VALVE
Filed July 23, 1956  2 Sheets-Sheet 1
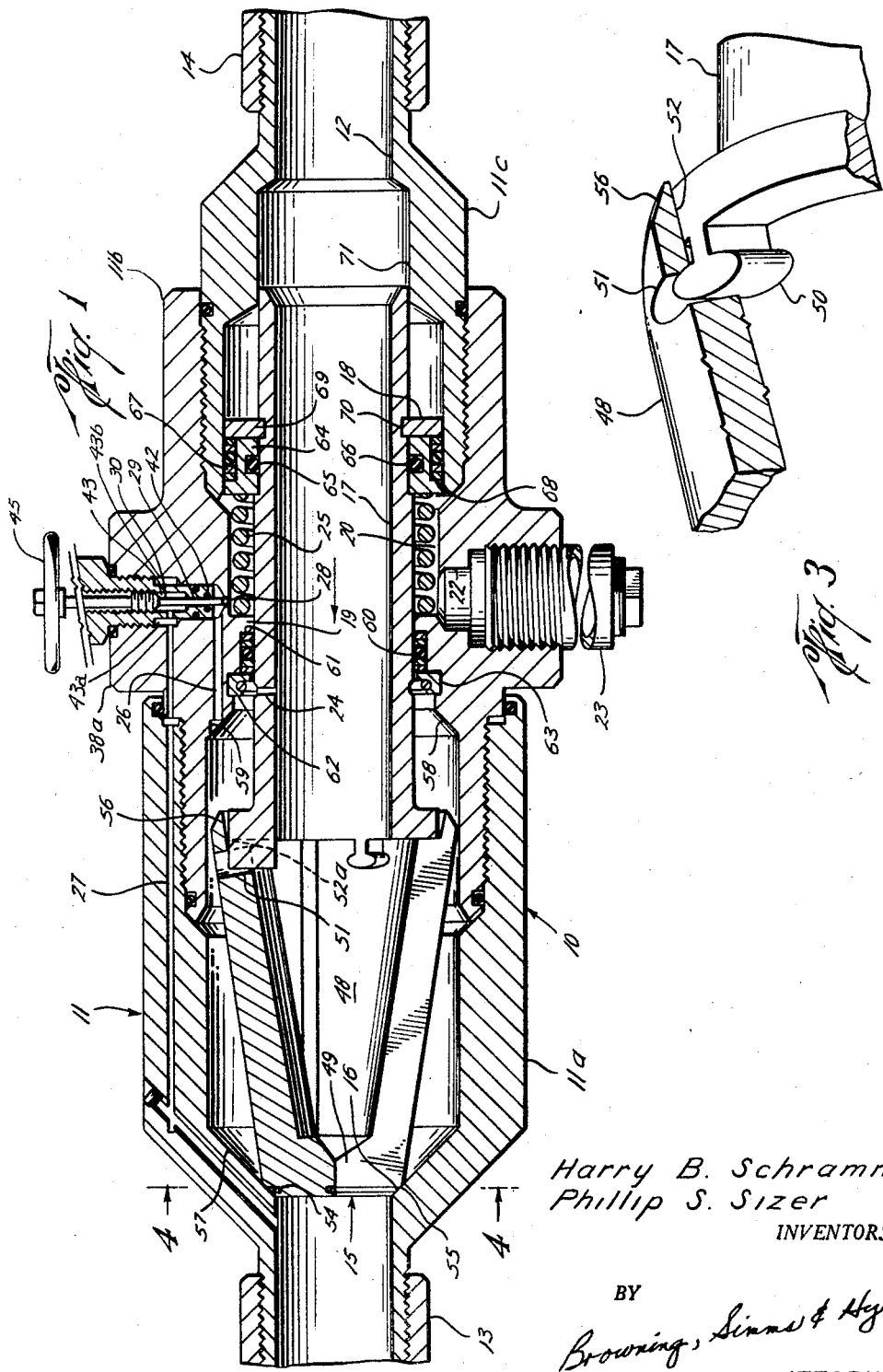
Harry B. Schramm
Phillip S. Sizer
INVENTORS
BY Brownings, Simms & Hyer
ATTORNEYS

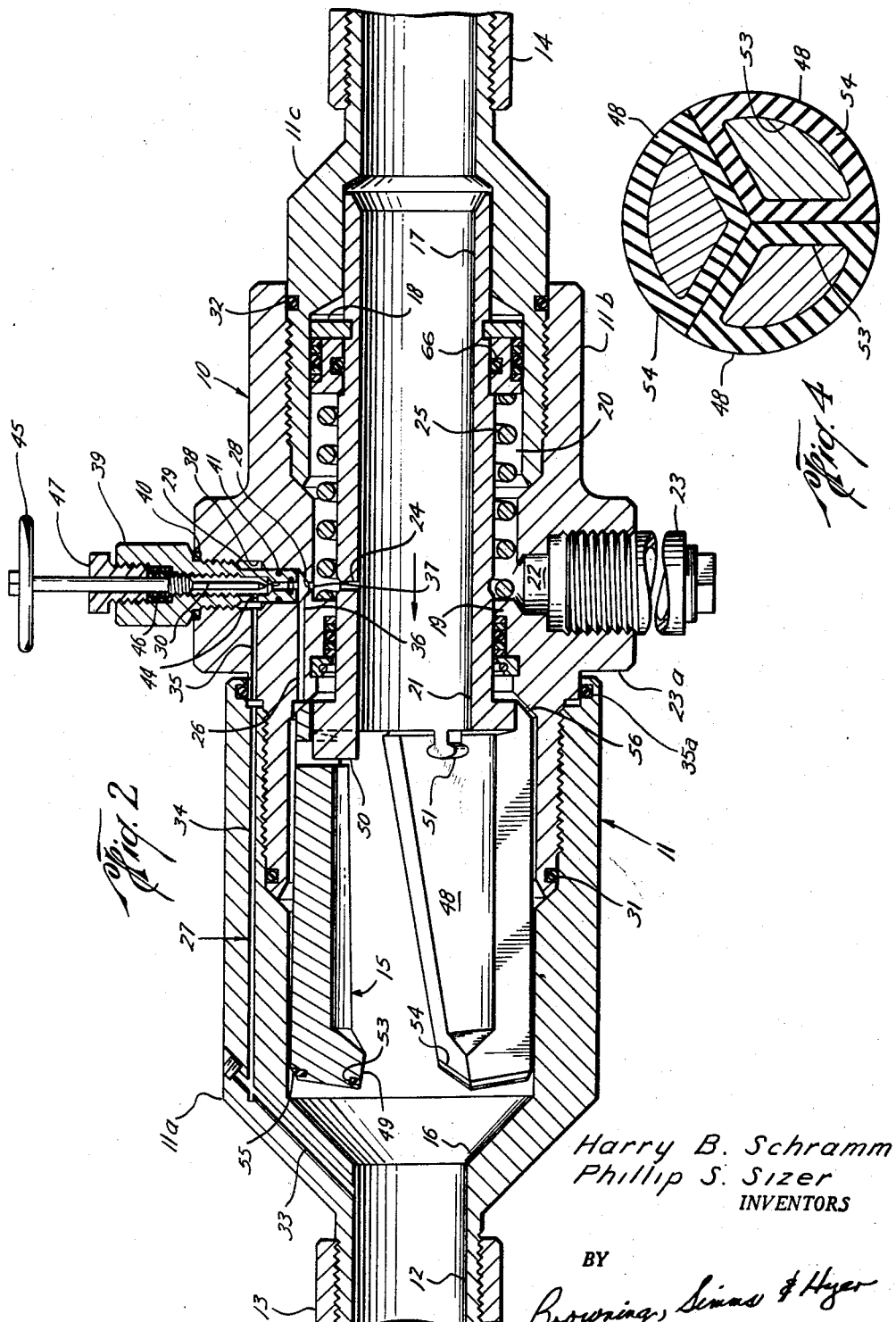

United States Patent Office 2,911,997
Patented Nov. 10, 1959

2,911,997

PRESSURE RESPONSIVE VALVE

Harry B. Schramm and Phillip S. Sizer, Dallas, Tex., assignors to Otis Engineering Corporation, Dallas, Tex., a corporation of Texas Application July 23, 1956, Serial No. 599,631

16 Claims. (Cl. 137—461)

This invention relates to improvements in pressure responsive valves of the type adapted to close in response to the venting of pressure from a control chamber. In this type of valve, the venting may be initiated either manually or automatically in response to a predetermined variation in pressure of the fluid within the control chamber, which may be the fluid controlled by the valve.

Patent Nos. 2,566,776 and 2,679,261 are concerned with valves representative of this general type. The former is directed to a gate valve which provides a full opening through its body in the open position thereof. Such a construction is advantageous not only because it permits various tools to be passed through the open valve, but also because it eliminates flow restrictions about the valve member which may cause surging and premature closing of the valve. The latter patent is directed to a valve having an axially movable or in-line valve member which is adapted to be reopened by the pressure of the fluid controlled by the valve. Although incapable of providing a full opening in its open position, this latter valve is particularly well suited for subsurface use in oil and gas wells because of a substantially more slender construction.

It is an object of the present invention to provide a valve of this general type having advantages inherent to both of the above-described prior valves, in that it is full opening and adapted to be opened by pressure of the fluid controlled by the valve.

A further object is to provide a valve of the character described in the foregoing object, which is of the inline type having a valve movable between opened and closed positions axially of the flow passage through the valve body.

Another object is to provide a valve of the character described in the foregoing object in which the pressure actuated means for opening same comprises a novel arrangement of valve-controlled by-pass conduits in the valve body.

Still another object is to provide a valve of the character described in any one of the foregoing objects, which is of the type having a control chamber adapted to be vented automatically in response to a variation in pressure of the fluid controlled by the valve.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a longitudinal sectional view of an illustrative embodiment of the valve of the present invention in closed position;

Fig. 2 is another longitudinal sectional view of the valve of Fig. 1, but in the fully opened position;

Fig. 3 is an enlarged perspective view, partly in section, of a hinged connection between the valve member of the valve of Figs. 1 and 2 and a tubular part thereof having a pressure responsive member slidable within the valve body; and Fig. 4 is a cross-sectional view of the nose or head of the valve member, taken substantially along broken lines 4—4 of Fig. 1.

Referring now particularly to the above-described drawings, the illustrative embodiment of the pressure responsive valve of the present invention is designated in its entirety by the reference character 10 and includes a valve body 11 having a flow passage 12 therethrough. Opposite ends of the body 11 may be threaded or provided with other means of connection with communicating conduits 13 and 14. Disposed within the valve body is a valve member 15 movable axially of the passage between seated and unseated positions with respect to a valve seat 16 surrounding the valve body passage. More particularly, and assuming flow of the fluid to be controlled from right to left, the valve member 15 is movable in a downstream direction to close the valve and in an upstream direction to provide an unobstructed axial flow path through the valve body corresponding to the minimum diameter of the passage 12 therethrough.

As previously mentioned, valves of this general type are adapted to be closed upon the venting of fluid pressure from a control chamber thereof. For this purpose, the valve member 15 is connected to a tubular part 17 having a pressure responsive member 18 thereon slidably and sealably engageable with the valve body upstream of a bearing 19 on the body which sealably surrounds the part 17 so as to define an annular variable capacity pressure chamber 20. The tubular part 17 is provided with a passageway 21 therethrough axially of the chamber 20 and communicable at its opposite ends with the passage 12 of the valve body in the open position of the valve. As is apparent from the drawings, the pressure of the fluid within the valve body passage acts upon the right-most face of the pressure responsive member 18, while the left-most face thereof is responsive to the pressure of the fluid within chamber 20. Thus, upon the venting of fluid through an outlet 22 from the chamber, the pressure responsive member 18 is urged in a downstream direction so as to seat the valve member 15.

A number of different arrangements may be employed for venting fluid through the outlet 22 so as to reduce the pressure within chamber 20. For example, a fitting 23 threadedly received in a boss 23a communicating with the outlet 22 may be a high or low pressure pilot valve of a type shown and described in Patent No. 2,566,776. These pilot valves advantageously open with a snap action and may be manually reset or closed so that, with the chamber 20 sealed off from the valve body passage, the valve may be reopened by the novel arrangement, in a manner to be described hereinafter. In a preferred embodiment, the control fluid is that controlled by the valve 10 and admitted to the chamber 20 from within the valve body passage by means of a bleed port 24 through the tubular part 17. The port 24 is positioned to communicate passageway 21 with the chamber 20 in the open position of the valve, and is of such size as to admit fluid to the chamber at a much slower rate than it is vented therefrom upon opening of the fitting 23. The resulting pressure drop within the chamber 20 will cause the tubular part 17 to move the valve member toward seated position, and the port 24 is positioned relatively adjacent the bearing 19 so as to move to the downstream side thereof rather quickly. In this manner, the chamber is sealed off from the valve body in the closed position of the valve, and only a minimum of control fluid escapes from the valve.

In this preferred embodiment, there may be two or more fittings 23 in the form of high and low pressure pilot valves.

The valve body 11 is provided with valve-controlled by-pass means for opening same by equalizing pressure across the valve seat 16 as well as between the sealed off pressure chamber 20 and the passage through the valve body on the upstream side of the valve seat when the valve member is in the closed position of Fig. 1. In this manner, the forces acting to hold the valve member seated so as to close the valve will be substantially balanced by those acting to open the valve. In fact, with the pressure responsive faces on opposite sides of pressure responsive member 18 being substantially equal, it will be understood that the valve member is held closed, subsequent to such pressure equalization, only by the force due to the equalized pressure within the valve body passage acting upon the annular area of valve seat 16. In order to automatically open the valve upon such pressure equalization, and also to hold the valve open until permitted to close in the manner above-described, there is provided spring means for urging the valve member to an unseated position and of such strength as to overcome the aforementioned resultant force. More particularly, this spring means comprises a coil spring 25 disposed within the annular pressure chamber 19 and compressed between bearing 19 and pressure responsive member 18.

This valve-controlled by-pass means comprises conduit means in the valve body connecting the valve body passage on the upstream side of the valve seat with the pressure chamber 20 and the valve body passage on the downstream side of the valve seat, and valve means for opening and closing said conduit means. More particularly, as shown in the drawings and in accordance with a preferred construction, the conduit means comprises a first conduit 26 connecting the pressure chamber 20 with a point in the valve body passage on the upstream side of the valve seat, and a second conduit 27 connecting the first conduit with a point in the valve body passage on the downstream side of the valve seat. The aforementioned valve means comprises a conical valve seat 28 across conduit 26 and a sleeve-type valve seat 29 across conduit 27 and substantially axially aligned with valve seat 28. In this manner, a single valve member 30 comprising a stem having a lower conical end may be provided for seating and unseating with respect to both of the valve seats 28 and 29, as shown in Fig. 1.

Thus, with reference to Figs. 1 and 2, it will be seen that the valve member 30 may be raised so as to first unseat its lower conical end from seat 28, whereby the pressure of the fluid within the passage through the valve body is admitted from a point upstream of the valve seat 16 into the chamber 20. Further withdrawal of valve member 30 will then cause its stem portion to unseat from valve seat 29 and permit communication, through interconnected conduits 26 and 27, of the fluid within the valve body passage upstream of the valve seat with the fluid downstream thereof, thereby equalizing pressures across the valve seat. Obviously, upon moving of the valve member 30 from its position in Fig. 2 to its seated position with respect to both seats 28 and 29, the valve 10 is again prepared for closing in response to the venting of pressure chamber 20. It will also be understood from the foregoing that if the pressure of the fluid downstream of the seated valve member 15 is substantially equal to or greater than the pressure of the fluid upstream thereof, unseating of valve member 30 from only valve seat 28 may be sufficient to automatically reopen the valve.

Referring now to the details of the above-described valve-controlled by-pass means, the valve body 11 is, for assembly purposes, made up of three coaxially arranged and threadedly connected parts 11a, 11b and 11c. More particularly, the female and male ends of parts 11a and 11b, respectively, are sealed with respect to one another by an O-ring 31 held within a recess of the latter in sealed engagement with the former, while the female and male ends of parts 11b and 11c, respectively, are similarly sealed with respect to one another by an O-ring 32. The part 11a is provided with drilled holes 33 and 34 which intersect to form a portion of conduit 27 which is adapted to communicate through an annular cavity in the end of said part with another portion thereof formed by drilled hole 35 within part 11b. An O-ring 35a is received within a recess in the cavity of part 11a for sealing engagement about part 11b intermediate the intersection of drilled holes 34 and 35 and the exterior of the valve body.

The conduit 26 is formed by longitudinally and radially extending holes 36 and 37, respectively, in the valve body part 11b which intersect at the lower conical end of an enlarged recess 38 within a boss 38a of such part. This recess extends radially outwardly from the intersection for connection with drilled hole 35 of conduit 27. More particularly, the recess 38 extends outwardly to the exterior of the boss so as to receive a hollow fitting 39 which supports valve member 30 and provides the remainder of conduit 27 as well as the seat 29 therefor.

Thus, the fitting 39 is threaded about an intermediate portion of its outer diameter for fixed reception within the outer end of recess 38 and is sealed with respect thereto by a packing element 40. The radially innermost portion of the outside diameter of the fitting is received closely within a reduced diameter portion of recess 38, and is provided with an O-ring 41 for sealing therewith. When so received within recess 38, the innermost end of fitting 39 terminates above the lower conical end of the recess and the seat 28 to permit free communication between holes 36 and 37 of conduit 26 when the valve member 30 is raised.

The inside diameter of this lower end of the fitting is reduced and provided with an O-ring 42 to sealably surround the stem of valve member 30 when it is extended therethrough, which ring defines the seat 29. Above this lower end, however, the inside diameter of the fitting is enlarged to provide an annular space 43 about the valve member 30, which space connects with drilled hole 35 through a port 44 and an annular space 43a about the fitting 39 and within an enlarged diameter portion 43b of recess 38. Thus, the portion of conduit 27 intermediate hole 35 and conduit 26 is formed by the annular space 43a, port 44, annular space 43, reduced inside diameter portion of the fitting 39, and the lower end of recess 38.

An intermediate length of valve member 30 is threadedly received within the inside diameter of the fitting above port 44 and is provided with a hand wheel 45 or the like at its outer end for selective radial movement. Packing 46 may be held in sealing relation about the stem of the valve member 30 by means of a gland nut 47 threadedly received in the outer end of the fitting.

The valve member 15 comprises a plurality of segments 48 which are hingedly connected to the flanged forward end of tubular part 17, as shown in detail in Fig. 3, for swinging radially together to close the valve upon movement of the valve member to seated position, as shown in Fig. 1, and swinging radially apart upon movement thereof to the unseated position, as shown in Fig. 2. In the seated position of the valve, the segments 48 provide an unobstructed axial flow path through the valve body which corresponds to the minimum diameter of the passage 12 therethrough.

Thus, the valve member may be made up of three such segments adapted to form a complete closure when brought together, as shown in Figs. 1 and 4. For this purpose, the head 49 of each segment covers approximately 120° in cross-section so that its opposite sides will abut with those of an adjacent segment head. The flanged forward end of tubular part 17 is provided with a T-shaped projection 50 over which a similarly shaped slot 51 on each of segments 48 is received in a manner to permit the segments to tilt angularly with respect to the axis of tubular part 17 as they are moved between seated and unseated positions. The rearmost ends of the segments are each provided with a flange 52 for overlying the outside of the flanged portion of the part 17, as best shown in Fig. 3, and thereby maintaining the T-shaped parts interconnected. The portions of the segments fitting behind T-shaped projections 50 are tapered as at 52a to accommodate the tilting of the segments relative to parts 17, as aforementioned.

The head 49 of each of the valve member segments is provided with a peripheral groove 53 for receiving a seal ring 54 of rubber or the like. As shown in the detail view of Fig. 4, when the valve member segments are brought together, these seal rings are adapted to abut one another and thus provide a sealing engagement between opposite faces or sides of the segment heads.

Both the segment heads and the rear ends of the valve member segments are tapered at 55 and 56 correspondingly to tapered surfaces 57 and 58, respectively, of the valve body passage for guiding said segments in their component of radial movement between seated and unseated positions. The intersection of drilled hole 36 with the body passage is cut away at 59 so that the engagement of tapered surface 56 with surface 58 does not interfere with flow through this hole.

With reference to certain details of the bearing 19 and the pressure responsive member 18 which form opposite ends of pressure chamber 20, it will be seen that the bearing seals about tubular part 17 by means of a packing ring 60 held against a shoulder 61 of the valve body by means of split ring retainer 62 received in annular recess 63 of the valve body. The pressure responsive member 18, on the other hand, includes a body 64 having an O-ring 65 held within a recess 66 on its inner diameter for sealing engagement with the tubular part 17, and a packing ring 67 held against a shoulder 68 about its outer diameter for sliding sealing engagement with valve body passage 12. Split retainer part 69 is held within a recess 70 of tubular part 18 to hold both body 64 and packing ring 67 in place.

The movement of tubular part 18 in an unseating or valve opening direction is stopped by the abutment of surface 56 of the valve member segments with tapered surface 58 of the valve body. It will be noted that the valve body passage is provided with an enlarged diameter portion 71 for guidably receiving the rearward end of tubular part 17 in such a manner that the flow way through passageway 21 may be of a diameter corresponding to the minimum diameter through valve body passage 12. Thus, the entire flow passage axially through the valve is "full-opening," as previously mentioned.

For purposes of summary of the operation of the valve 10, it will be assumed that the valve member 30 is in the open position of Fig. 2 by the force of spring 25, and that the hand wheel 45 has been manipulated to lower the valve member 30 to its seated positions of Fig. 1 for preventing communication between conduits 26 and 27 as well as between chamber 20 and either of said conduits. At such time, however, that the fluid within the valve body passage, and thus within control chamber 20, reaches a predetermined value, the pilot valve 23 will be opened with a snap-action. As a result, fluid will be vented from the chamber 20 at a greater rate than it is admitted thereto through bleed port 24, so that the tubular part 17 and valve member 15 are caused to move toward the position of Fig. 1 for closing the valve. During such movement of the tubular part, bleed port 24 passes from the upstream to the downstream side of bearing 19 so as to seal off the chamber 20 from the valve body passage, and tapered valve member surfaces 55 abut against tapered body surface 57 for guided movement radially toward one another.

When it is desired to reopen the valve, the pilot valve 23 is first reset to close outlet 22 from the chamber 20. The handwheel 45 is then manipulated to raise the valve member 30, whereby pressure within the valve body passage upstream of valve seat 16 is first admitted to the vented and sealed-off chamber 20, and then equalized with respect to the pressure within the valve body passage downstream of the seat. This equalization of pressures permits the force of spring 25 to overcome the force due to pressure acting upon the area of the valve seat, and the valve member will unseat and move toward the full opening position of Fig. 2. During such movement of the valve member its tapered surfaces 56 abut against tapered body surface 58 so as to force the valve member segments radially apart. When it is desired to again place the valve in a condition for closing in the manner above-described, the hand wheel 45 is again manipulated to move the valve member 30 to its closed position of Fig. 1.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure responsive valve, comprising a valve body having a passage therethrough, a valve seat on the body surrounding the passage, a valve member extending across said seat to close said passage when the valve member is in seated position and swingable to an unseated position laterally of the passage a distance sufficient that the member then lies outside an axial flow path through the valve body corresponding to the minimum diameter of the passage therethrough, a variable capacity pressure chamber in the body formed in part by a pressure responsive face of a pressure responsive member connected to the valve member for movement therewith axially of the body passage and sealably slidable within the body, said pressure responsive member being arranged to move in an upstream direction to unseat the valve member upon expansion of the chamber and to move in a downstream direction to seat said valve member upon contraction of the chamber, means in the body for venting the chamber so as to permit contraction thereof, means including a valve-controlled by-pass conduit within the valve body for admitting fluid from the valve body passage into the vented chamber so as to urge the valve member in a direction to expand the chamber, and an opposite face on the pressure responsive member constantly exposed to the pressure of the fluid on the upstream side of the seat and wherein said by-passage conduit connects the chamber with the valve body passage at a point on the upstream side of the valve seat.

2. A pressure responsive valve of the character defined in claim 1, wherein said last-mentioned means also includes a valve-controlled by-pass conduit in the valve body for equalizing pressures across the valve seat.

3. A pressure responsive valve, comprising a valve body having a passage therethrough, a valve seat on the body surrounding the passage, a valve member including parts movable together and against said seat to close the passage and also movable apart to an unseated position in which the parts lie laterally of the passage to provide an unobstructed axial flow path through the valve body corresponding to the minimum diameter of the passage therethrough, a tubular part connected to the valve member for movement axially of the body passage and having its interior in communication with the valve body passage, a bearing on the body sealably surrounding the tubular part, a pressure responsive member on the tubular part and sealably slidable within the body, upon seating and unseating of the valve member, to provide a variable capacity pressure chamber, opposite faces on said pressure responsive member being constantly exposed to the pressure within the chamber and the pressure within the valve body passage upstream of the valve seat, respectively, said pressure responsive member being arranged to move in an upstream direction to unseat the valve member upon expansion of the chamber and to move in a downstream direction to seat said valve member upon contraction of the chamber, means in the valve body for venting the chamber, and means including a valve-controlled by-pass conduit within the valve body for admitting fluid from the valve body passage into the chamber to urge the valve member in a direction to expand the chamber.

4. A pressure responsive valve of the character defined in claim 3, including a bleed port in the tubular part positioned to communicate the chamber with the interior of the tubular part in the unseated position of the valve member and prevent such communication in the seated position thereof.

5. A pressure responsive valve, comprising a valve body having a passage therethrough, a valve seat on the body surrounding the passage, a valve member movable axially within the body passage in a downstream direction to seat upon the valve seat and close the valve and in an upstream direction to unseat therefrom, a tubular part connected to the valve member and having a passageway therethrough communicating at opposite ends with the body passage in the open position of the valve member, a variable capacity pressure chamber in the body formed in part by a pressure responsive face on a pressure responsive member having a connection with the tubular part for movement therewith and sealingly slidable within the body, the opposite face of said pressure responsive member being constantly exposed to the pressure of fluid in the body passage upstream of the seat, said chamber being upstream of the valve seat and about said passageway, means in the valve body for venting the chamber, means for equalizing pressure across the valve seat as well as between the chamber and the valve body passage on the upstream side of the valve seat in the closed position of the valve, and spring means urging the valve member toward its unseated position so as to open the valve upon equalization of said pressures.

6. A pressure responsive valve of the character defined in claim 5, wherein said tubular part is provided with a bleed port therethrough for communicating the chamber with the passageway in the open position of the valve and preventing such communication in the closed position thereof.

7. A pressure responsive valve of the character defined in claim 5, wherein said pressure equalizing means comprises valve-controlled by-pass means in the valve body connecting the valve body passage on the upstream side of the valve seat with the pressure chamber and the valve body passage on the downstream side of the valve seat.

8. A pressure responsive valve of the character defined in claim 7, wherein said by-pass means comprises a first conduit connecting the pressure chamber with a point in the valve body passage on the upstream side of the valve seat, a second conduit connecting the first conduit with a point in the valve body passage on the downstream side of the valve seat, substantially aligned seats across each of said conduits, and a single valve member seatable and unseatable with respect to said last-mentioned seats for opening and closing said conduits.

9. A pressure responsive valve, comprising a valve body having a passage therethrough, a valve seat on the body surrounding the passage, a valve member extending across said seat to close said passage when the valve member is in seated position and swingable to an unseated position laterally of the passage a distance sufficient that the member then lies outside an axial flow path through the valve body corresponding to the minimum diameter of the passage therethrough, a tubular part connected to the valve member for movement axially of the body passage and having a passageway therethrough communicating at opposite ends with the body passage in the unseated position of the valve member, a bearing on the valve body sealably surrounding the tubular part, a pressure responsive member on the tubular part slidably engageable with the valve body and having a pressure responsive face cooperable with the bearing to provide a variable capacity pressure chamber upstream of the bearing and valve seat and about said passageway, means in the body for venting the chamber, the opposite face of said pressure responsive member being constantly exposed to the pressure of fluid in the body passage upstream of the seat, means for equalizing pressure across the valve seat as well as between the chamber and the valve body passage on the upstream side of the valve seat in the closed position of the valve, and spring means urging the valve member toward its unseated position so as to open the valve upon equalization of said pressure.

10. A pressure responsive valve of the character defined in claim 9, wherein said valve member comprises a plurality of segments hinged to the tubular part for swinging movement radially together upon seating of the valve member and radially apart upon unseating thereof.

11. A pressure responsive valve of the character defined in claim 10, wherein said valve body is provided with tapered surfaces intermediate said seat and chamber for guiding the valve member segments during movement between seated and unseated positions.

12. A pressure responsive valve of the character defined in claim 9, wherein said tubular part is provided with a bleed port therethrough for communicating the chamber with the passageway in the open position of the valve and preventing such communication in the closed position thereof.

13. A pressure responsive valve of the character defined in claim 9, wherein said pressure equalizing means comprises valve-controlled by-pass means in the valve body connecting the valve body passage on the upstream side of the valve seat with the pressure chamber and the valve body passage on the downstream side of the valve seat.

14. A pressure responsive valve of the character defined in claim 13, wherein said by-pass means comprises a first conduit connecting the pressure chamber with a point in the valve body passage on the upstream side of the valve seat, a second conduit connecting the first conduit with a point in the valve body passage on the downstream side of the valve seat, substantially aligned seats across each of said conduits, and a single valve member seatable and unseatable with respect to said last-mentioned seats for opening and closing said conduits.

15. A pressure responsive valve, comprising a valve body having a passage therethrough, a valve seat on the body surrounding the passage, a valve member extending across said seat to close said passage when the valve member is in seated position and movable to an unseated position laterally of the passage a distance sufficient that the member then lies outside the axial flow path through the valve body corresponding to the minimum diameter of the passage therethrough, a variable capacity pressure chamber in the body formed in part by a pressure responsive face of a pressure responsive member connected to the valve member for movement therewith and sealably slidable within the body, the opposite face of said pressure responsive member being constantly exposed to the pressure of the fluid within the valve body passage upstream of the valve seat, said pressure responsive member being arranged to unseat the valve member upon expansion of the chamber and to seat said valve member upon contraction of the chamber, means in the body for venting the chamber so as to permit contraction thereof, means including a valve controlled by-pass conduit within the valve body for admitting fluid from the valve body passage into the vented chamber so as to urge the valve member in a direction to expand the chamber, and bleed means responsive to movement of the valve member between seated and unseated positions to communicate the chamber with the fluid in the body passage upstream of the seat in the unseated position of the valve member and to prevent such communication in the seated position thereof.

16. A pressure responsive valve, comprising a valve body having a passage therethrough, a valve seat on the body surrounding the passage, a valve member extending across said seat to close said passage when the valve member is in seated position and movable to an unseated position laterally of the passage a distance sufficient that the valve member then lies outside of the axial flow path through the valve body corresponding to the minimum diameter of the passage therethrough, a tubular part connected to the valve member and having its interior in communication with the valve body passage, a bearing in the body sealably surrounding the tubular part, a pressure responsive member on the tubular part and sealably slidable within the body, upon seating and unseating of the valve member, to provide a variable capacity pressure chamber, opposite faces on the pressure responsive member being constantly exposed to the pressure within the chamber and pressure within the valve body passage upstream of the valve seat, respectively, means in the valve body for venting the chamber, means including a valve controlled by-pass conduit within the valve body for admitting fluid from the valve body passage into the chamber to urge the valve member in a direction to expand the chamber, and a bleed port in the tubular part positioned to communicate the chamber with the interior of the tubular part in the unseated position of the valve member and to prevent such communication in the seated position thereof.

References Cited in the file of this patent

UNITED STATES PATENTS

| | | |
|---|---|---|
| 570,727 | Gale | Nov. 3, 1896 |
| 845,063 | Desper | Feb. 26, 1907 |
| 1,842,146 | Brotherton | Jan. 19, 1932 |
| 1,869,345 | Vallendor | July 26, 1932 |
| 2,233,041 | Alley | Feb. 25, 1941 |
| 2,502,803 | Sorensen | Apr. 4, 1950 |
| 2,635,634 | Thurber | Apr. 21, 1953 |
| 2,679,261 | Otis | May 25, 1954 |

FOREIGN PATENTS

| | | |
|---|---|---|
| 1,728 | Great Britain | Jan. 21, 1898 |
| 15,250 | Great Britain | June 25, 1914 |